United States Patent
Ramanath (10) Patent No.: US 9,538,100 B1
(45) Date of Patent: Jan. 3, 2017

(54) SYSTEMS AND METHODS FOR IMAGE PROCESSING USING VISIBLE AND NEAR-INFRARED SPECTRAL INFORMATION

(71) Applicant: Amazon Technologies, Inc., Reno, NV (US)

(72) Inventor: Rajeev Ramanath, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 709 days.

(21) Appl. No.: 13/891,863

(22) Filed: May 10, 2013

(51) Int. Cl.
*H04N 5/33* (2006.01)
*H04N 17/00* (2006.01)

(52) U.S. Cl.
CPC .............. *H04N 5/33* (2013.01); *H04N 17/002* (2013.01)

(58) Field of Classification Search
CPC ............ G06T 2207/10024; G06T 2207/10016; G06T 7/0018; G06T 7/2046; G01J 3/00; G01J 3/28; G01J 3/46; G01J 3/524; G01J 2003/003; H04N 1/60; H04N 5/33
USPC ........................................................ 348/164
See application file for complete search history.

(56) References Cited

U.S. PATENT DOCUMENTS

| | | | |
|---|---|---|---|
| 5,172,224 A * | 12/1992 | Collette et al. | 358/515 |
| 6,600,833 B1 * | 7/2003 | Tan et al. | 382/167 |
| 2006/0023942 A1 * | 2/2006 | Guleryuz | 382/167 |
| 2012/0015825 A1 * | 1/2012 | Zhong et al. | 506/6 |
| 2012/0253727 A1 * | 10/2012 | Lianza et al. | 702/104 |
| 2013/0050504 A1 * | 2/2013 | Safaee-Rad et al. | 348/181 |
| 2013/0083157 A1 * | 4/2013 | Kamon et al. | 348/33 |
| 2013/0250322 A1 * | 9/2013 | Kawabata et al. | 358/1.9 |
| 2014/0071177 A1 * | 3/2014 | Chu et al. | 345/690 |
| 2014/0253686 A1 * | 9/2014 | Wong et al. | 348/46 |

* cited by examiner

*Primary Examiner* — Michael Lee
(74) *Attorney, Agent, or Firm* — Sutherland Asbill & Brennan LLP (57) ABSTRACT

Systems and methods for receiving image information with spectral components in the visible and near infrared (NIR) spectral ranges and separating the image information in the visible spectral range from the image information in the NIR spectral range is described. The separation of the of the visible and NIR spectral range image information may be performed using a colorimetric calibration matrix. The colorimetric calibration matrix may be determined based at least in part on training image information with a known tristimulus matrix.

23 Claims, 6 Drawing Sheets

SYSTEMS AND METHODS FOR IMAGE PROCESSING USING VISIBLE AND NEAR-INFRARED SPECTRAL INFORMATION

BACKGROUND

In certain imaging systems, such a cameras on mobile computing platforms, silicon (Si) based image sensors, such as charge couple device (CCD) or complementary metal oxide semiconductor (CMOS) image sensors, may be used for image capture. The bandgap of Si, at $E_g=1.1$ electron volts (eV), corresponds to 1125 nanometers (nm) wavelength, which is within the near-infrared (NIR) spectral region. Therefore, the Si material of Si-based image sensors are sensitive up to a wavelength of about 1125 nm. The spectral sensitivity of these Si-based image sensors may correspond to an optical wavelength range from about 350 nm to about 1125 nm. This may enable the acquisition of spectral information at the visible spectral range corresponding to wavelengths of about 380 nm to about 780 nm and the NIR spectral range corresponding to wavelengths of about 780 nm to about 1125 nm.

For most applications, the spectral information associated with a visible range of wavelengths of about 380 nm to 780 nm is used to generate images. In these applications, the capture of NIR spectral information may introduce haze, noise, or otherwise degrade the image in the visible spectral range. Therefore, Si-based image sensor often have NIR filters provided thereon to prevent the detection of radiation in the NIR frequency range for most applications. The NIR filters, by design, filter out spectral information that may otherwise be captured by the Si-based image sensor. Furthermore, the NIR filters may introduce merit, such as processing and/or material merit during manufacture of the Si-based image sensors.

BRIEF DESCRIPTION OF THE DRAWINGS

The detailed description is set forth with reference to the accompanying figures. The use of the same reference numbers in different figures indicates similar or identical items; however, various embodiments may utilize elements and/or components other than those illustrated in the figures.

DETAILED DESCRIPTION

Overview

Embodiments of the present disclosure may include systems and methods for the use of Si-based image sensors without NIR filters provided thereon for imaging applications, such as cameras on personal imaging systems. Si-based image sensors without NIR filters provided thereon may capture a wider range of spectral information than Si-based image sensors with NIR filters. Furthermore, Si-based image sensors without NIR filters may be lower merit and may require fewer processes to manufacture than Si-based image sensors with NIR filters. Embodiments of the disclosure may enable capturing, by a Si-based image sensor, image information in at least both the visible range of about 380 nm to about 780 nm and the NIR range of about 780 nm to about 1125 nm. The captured information may then be substantially separated into visible spectral information and NIR spectral information. An image may be generated based at least in part on the visible spectral information. In some cases, the NIR spectral information may also be used for a variety of applications, such as security applications, image enhancements to the visible image, low-light imaging, and/or thermal imaging.

In certain further embodiments, an imaging system configured to receive and/or capture image information, such as with an image sensor communicatively coupled to the imaging system in both the visible and the NIR range, may further be configured to process the image information. The image sensor may be configured to detect and spatially resolve light reflecting off of one or more objects in a scene to be imaged by the imaging system. The image information, as received by the imaging system, may incorporate spatial, spectral, and in the case of moving images, temporal information associated with a scene. The image information may include an indication of intensity of various pixels of the image sensor, where the various pixels may correspond to points and/or reflectance spectra of the scene to be imaged.

The imaging system may be configured to have stored thereon, a colorimetric calibration matrix, such as in memory of the imaging system, that may be used to segregate image information in the visible spectral range from image information in the NIR spectral range. In certain embodiments, the imaging system may be configured to multiply the colorimetric calibration matrix with the image information received from the image sensor. In some cases, the colorimetric calibration matrix may be multiplied with the image information at each pixel of image information by the imaging system to segregate the visible image information and NIR image information. In the same or different embodiments, the colorimetric calibration matrix may be a 3×3 (3 column and 3 row) array. The image information may be segregated by the imaging system and used to generate a visible image file and/or a NIR image file. The visible image file with the visible spectrum image information may be rendered on a display, such as a display on the imaging system or another electronic device.

The imaging system may further be configured to generate a colorimetric calibration matrix associated with an image sensor, such as an image sensor without an NIR filter of the imaging system, for the purpose of separating visible spectral information from NIR spectral information. Determining the colorimetric calibration matrix may be based at least in part on training image information received and/or captured by the colorimetric calibration matrix. The training image information may be received as a data file by the imaging system in certain embodiments. In other embodiments, the training image may be captured by the imaging system, such as with an image sensor disposed on the imaging system, of a scene where the desired image information, such as the desired color image output from the imaging system, is known. In other words, the desired tristimulus matrix output of each pixel of the desired image for the received and/or captured training image may be known and may be used for the purposes of generating a colorimetric calibration matrix, or otherwise training the imaging system on how to segregate visible spectral image information from NIR spectral image information of captured images, as received from an image sensor without a NIR filter.

Determining the colorimetric calibration matrix may involve, in certain embodiments, the comparison of image information received from an image sensor of a training image scene and known and/or ideal image information within the visible spectral range associated with the scene of the training image, such as known colorimetric information, of the training image. The known image information of the training image may be a known tristimulus value of the training image, or pixels thereof. Further still, in certain embodiments, the determination of the colorimetric calibration matrix may involve generating a merit function based at least in part on the known tristimulus value of the pixels of the training image and the respective image information captured by the image sensor of the imaging system. The merit function may be applied to one or more algorithms to generate a colorimetric calibration matrix that approximately minimizes and/or optimizes the merit function. In certain embodiments, the merit function may be minimized and/or optimized using a variety of algorithms, such as analytical algorithms, iterative algorithms, Wiener restoration algorithms, Markov operations, Kalman filtering, evolutionary algorithms, artificial intelligence, Lagrange multipliers, or the like. Once the colorimetric calibration matrix is determined, the colorimetric calibration may be stored on memory of the imaging system for use in processing subsequent images captured by the imaging system.

In certain embodiments, the imaging system may generate more than one colorimetric calibration matrix. For example, in an imaging system with three CCDs (3CCD), there may be a separate colorimetric calibration matrix, such as a 3×3 colorimetric calibration matrix for each of the three CCDs of the imaging system. Furthermore, there may be multiple colorimetric calibration matrices across various parts of the spectral range of the image data captured and/or received by the imaging system. Further still, separate (or discontinuous) colorimetric calibration matrices may be used for different illuminations and/or focal conditions.

In certain embodiments, the imaging system may also have an NIR colorimetric calibration matrix, which may be used by the imaging system to derive the NIR spectral image information from the image information received by the imaging system, such as from the image sensors. In some cases, the NIR colorimetric calibration matrix may be derived by subtracting the colorimetric calibration matrix from an identity matrix.

The generation of the colorimetric calibration matrix for processing the image information captured by the imaging system may be performed, in certain embodiments, only once before the user of the imaging system wishes to image scenes with the imaging system. In certain cases, the determination of the colorimetric calibration matrix may be based on received training image information at the provider of the imaging system, such as a manufacturer of the imaging system. In other cases, the colorimetric calibration matrix may be determined upon power-up of the imaging system by the user at the point of use of the imaging system. In other embodiments, the colorimetric calibration matrix determination may be performed whenever the provider and/or the user of the imaging system desires, such as by executing an application and/or software on the imaging system. In yet other embodiments, the determination of the colorimetric calibration matrix may be performed on a computing system separate from the imaging system and the resulting determined colorimetric calibration matrix may be transmitted to the imaging system.

It will be appreciated that naturally occurring substances generally have smooth spectral reflectance with optical reflectance in the range of about 350 nm to about 1500 nm. Some objects may have similar spectral reflectance functions in the visible range of the spectrum and therefore, resulting in the same color perception in humans, but may have different reflectance spectra in the NIR range. This type of information typically is 'lost' in image sensors and/or cameras with NIR and/or IR filters. Furthermore, there may be high spectral correlation between the visible and NIR regions of the spectrum when imaging a variety of objects.

The systems and methods, as disclosed herein, may further make use of the NIR wavelength range image information to produce an improved rendition of the visible color image compared to a camera and/or imaging system that makes use of only the visible range of the spectrum. Furthermore, the imaging system may be configured to generate a relatively accurate estimate of the NIR region of the spectrum and provide a separate NIR and visible rendition of and imaged scene. Further yet, the imaging system may perform techniques to compensate for the noise sensitivity of the image sensors in the formulation of the color calibration matrices.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Figure 1:
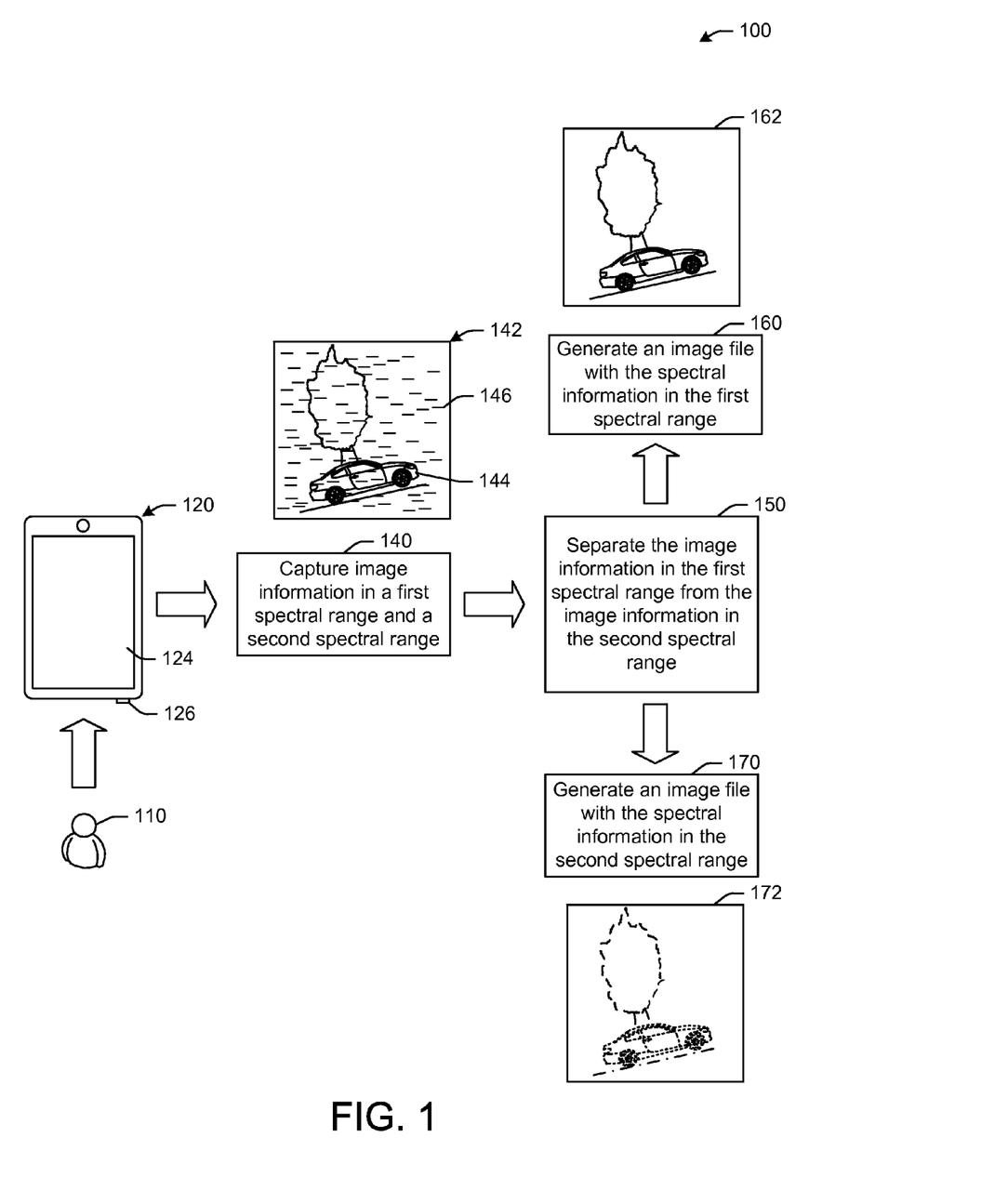
FIG. 1 is a schematic diagram that illustrates the use environment of an imaging system providing a first image with a first spectral range and a second image with a second spectral range, in accordance with embodiments of the disclosure.

Referring now to FIG. 1, a schematic diagram that illustrates a use environment 100 of an example imaging system 120 and/or image capture device providing a first image with a first spectral range and a second image with a second spectral range, in accordance with embodiments of the disclosure, is described. The imaging system 120 may be configured to receive user 110 input via one or more user input/output (I/O) interfaces, such as a touch sensitive display screen 124 and one or more buttons 126 with which the user 110 may interact with the imaging system 120. The imaging system may further include one or more image sensors 130 (hereinafter referred to in the singular or plural) configured to capture image information, such as image information related to a scene to be imaged.

As depicted, the user 110 may interact with the imaging system 120, such as with one or more of the I/O interfaces 124, 126 to initiate a capture of an image via the image sensor 130. The imaging system 120 may capture the image information 140 in a first and second optical spectral range. The first spectral range may be the visible range of about 380 nm to about 780 nm wavelength of light and the second spectral range may be in the NIR range of about 780 nm to about 1125 nm wavelength. The captured image information 140 may be based on signals from the image sensor 130. The signals of the image sensor 130 may be data associated with each pixel of the image sensor corresponding to a point in the scene being imaged by the imaging system 120. Each pixel may have data correspond to sub spectral bands within the visible spectral band, such as red, green, and blue spectral bands. In one aspect, the blue spectral band information may correspond to intensity of light captured at a particular position of the scene for which the image information is captured in about the 380 nm to about 490 nm wavelength range. In another aspect, the green spectral band information may correspond to intensity of light captured at a particular position of the scene for which the image information is captured in about the 490 nm to about 590 nm wavelength range. In yet another aspect, the red spectral band information may correspond to intensity of light captured at a particular position of the scene for which the image information is captured in about the 590 nm to about 780 nm wavelength range. Therefore, each pixel of the image sensor may have three color, such as red, green, and blue, information associated therewith.

The captured image information 140 may appear as image 142 if rendered on a display, such as the touch sensitive display screen 124 of the imaging system 120. This rendered image 142 may include the image information in the visible range 144 and artifacts arising for image information in the NIR range and noise 146. It should be noted that the NIR image information may be incorporated within each of the color (e.g. red, green, blue) data that may be provided by the image sensor 130 at each pixel. When rendered on the display as image 142, it should be appreciated that the NIR image information my produce haze, or otherwise degradation of the image 142. This may be due to some of the image sensor signal resulting from the NIR intensity detected by the image sensor 130 and noise across the detection spectrum being distributed among the red, green, and blue spectral ranges of each pixel of the captured image.

The imaging system 120 may further be configured to separate the image information in the first spectral range from the image information in the second spectral range 150. Therefore, the imaging system may be configured to separate the image information in the visible range from the image information in the NIR range. This separation of the image information in the two spectral ranges may be performed by the imaging system 120 using one or more mathematical algorithms. The spectral segregation may be performed using a colorimetric calibration matrix that was previously determined by the imaging system 120 and/or provided to the imaging system 120.

From the spectral separation of the image information in the first spectral range, the imaging system 120 may be configured to generate an image file 160 therefrom. In other words, the image file 160 may include visible image information segregated form the captured image information provided by the image sensors 130. The image file may be provided in any suitable format including, but not limited to, Joint Photographic Experts Group (JPEG), graphics interchange format (GIF), portable network graphics (PNG), tagged image file format (TIFF), bit map (BMP), or the like and/or in any suitable resolution, size, brightness, or aspect ratio. The image file 160 may be rendered on a display, such as the touch sensitive display screen 124 of the imaging system 120, to provide a rendered image 162. This rendered image 162 may include the image information substantially in the visible range 144. It should be noted that there may still be remnants of NIR spectral range signal and/or information and noise due to incomplete rejection of NIR spectral image information and/or noise during the image processing of 150 and 160.

From the spectral separation of the image information in the second spectral range, the imaging system 120 may be configured to generate an image file 170 therefrom. In other words, the image file 170 may include NIR image information segregated form the captured image information provided by the image sensors 130. The image file may be provided in any suitable data file format and/or in any suitable resolution, size, brightness, or aspect ratio. The image file 170 may be rendered on a display, such as the touch sensitive display screen 124 of the imaging system 120, to provide a rendered image 172. This rendered image 172 may include the image information substantially in the NIR range 146. Therefore, the rendered image may be a transformation of the image information in the NIR spectral range. For example, the image information in the NIR spectral range may be shifted in wavelength for display as image 172. It should be noted that there may still be remnants of visible spectral range signal and/or information and noise due to incomplete rejection of visible spectral image information and/or noise during the image processing of 150 and 170.

The users 110 may be any suitable individual or group of individuals that may use or interact with the imaging system 120 for imaging or non-imaging related activities. The imaging system 120 may be any one of suitable devices that may be configured to capture and/or process one or more images. The imaging system 120 executes one or more applications, software, and/or instructions. Therefore, the imaging system 120 may be configured to execute a variety of software, applications, code and/or instructions to perform a variety of functions. n some cases, the one or more applications, software, and/or instructions may utilize the captured and/or processed images provided by the imaging system 120. The imaging system 120, as used herein, may be any variety of imaging devices, electronic devices, communications devices, and/or mobile devices. The imaging system 120 may include, but is not limited to, cameras, digital cameras, scanners, tablet computing devices, electronic book (ebook) readers, netbook computers, notebook computers, laptop computers, desktop computers, personal digital assistants (PDA), smart phones, web-enabled televisions, video game consoles, set top boxes (STB), or the like. While the drawings and/or specification may portray the electronic device 120 in the likeness of an ebook reader and/or tablet computing device, the disclosure is not limited to such. Indeed, the systems and methods described herein may apply to any electronic device capable of capturing and/or processing electronic images.

While the specific I/O components 124, 126 are shown, there may be any number and/or variety of I/O components and/or sensors disposed on the imaging system 120, such as one or more microphones, accelerometers, speakers, haptic devices, or the like. The touch sensitive display screen 124 may be any suitable touch sensitive display, including, but not limited to a capacitive panel. The capacitive panel may have a plurality of capacitive cells (not shown) of any shape and size that may have a varying charge associated therewith. The charge on each cell may vary based on proximity of a pointing device, such as a finger near one or more of the cells and the variation in charge may be interpreted by the imaging system 120 as an indication of touching the touch sensitive display screen 124. The functioning of capacitive panels is well known, and in the interest of brevity, will not be reviewed here. The touch sensitive display screen 124 and/or other I/O components 126 may be configured to accept user input and/or provide output to the user 110.

Figure 2:
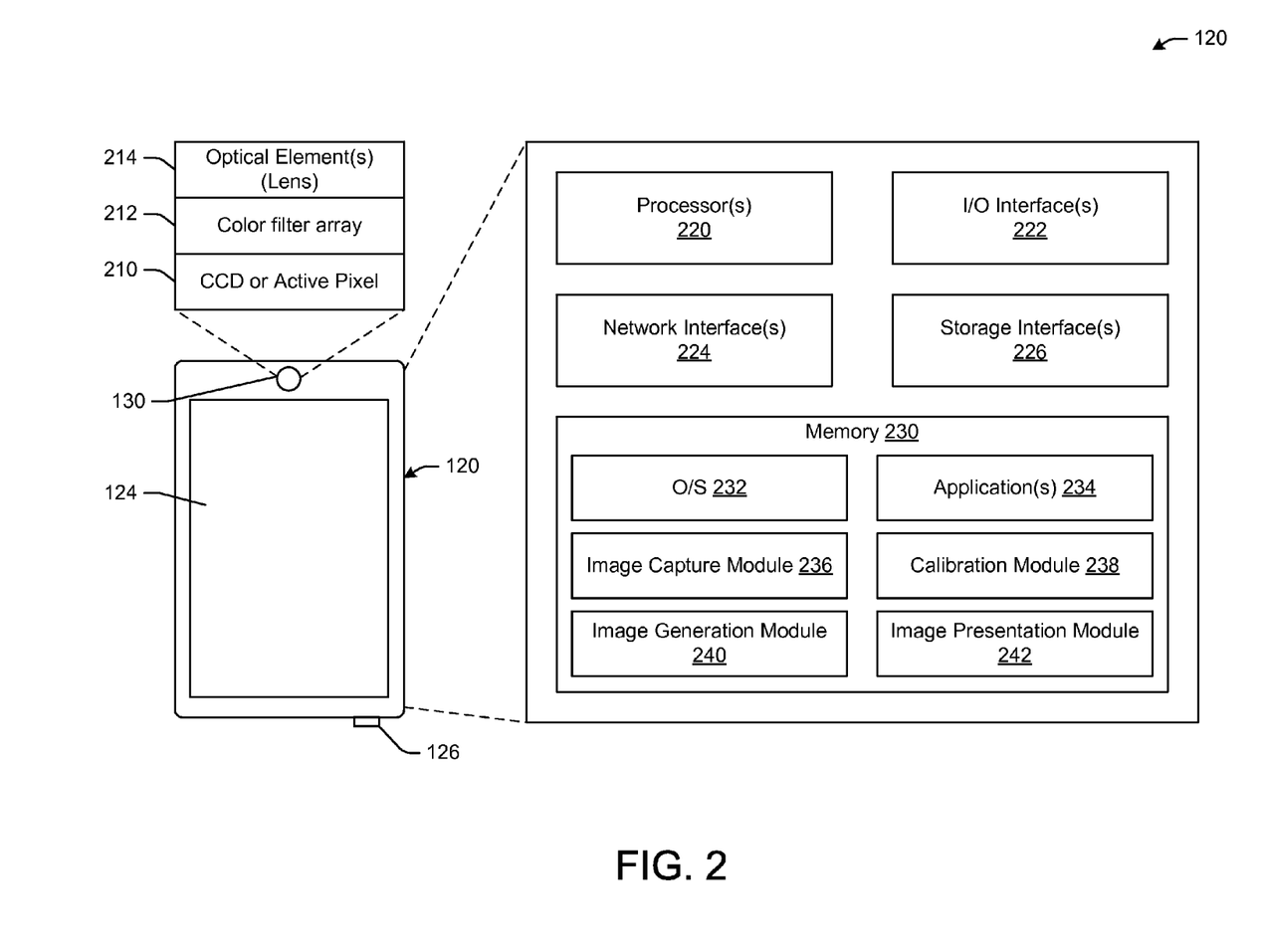
FIG. 2 is a schematic diagram that illustrates the example imaging system of FIG. 1 including physical and/or functional components thereof, in accordance with embodiments of the disclosure.

Referring now to FIG. 2 with continuing reference to FIG. 1, the imaging system 120 of FIG. 1, including physical and/or functional components thereof, in accordance with embodiments of the disclosure, is described.

The image sensor 130 may be any known device that converts an optical image or optical input to a corresponding electronic signal. The image sensor 130 may be of any known variety including a charge coupled device (CCD), complementary metal oxide semiconductor (CMOS) sensors, or the like. The image sensor 130 may further be of any suitable pixel count and aspect ratio. Further still, the image sensor 130 may be sensitive to any frequency of radiation, including infrared and near infrared (NIR), visible, and/or near-ultraviolet (UV). The image sensor 130 may include a photosensitive substrate 210, such as a CCD or Active Pixel substrate. As photons impinge on this photosensitive substrate 210 of the image sensor 130, such as photons reflected off of objects in a scene to be imaged, electron-hole pairs may be formed, thereby indicating the optical radiation flux. The image sensor 130 may further include a color filter array 212, such as a Bayer color filter or a Foveon vertical filter. In certain embodiments, it will be appreciated that a 3CCD system may be used where each CCD detects one of red, green, or blue light. The image sensor 130 may yet further include one or more optical elements 214, such as a lens. The optical element 214 may provide one or both of optical manipulation of incoming radiation, such as magnification and/or focusing as well as, protection for the photosensitive substrate 210.

The imaging system 120 may further include one or more processors 220, one or more I/O device interfaces 222, one or more network interface(s) 224, one or more storage interface(s) 226, and one or more memories 230. In some examples, the processors 220 of the imaging system 120 may be implemented as appropriate in hardware, software, firmware, or combinations thereof. Software or firmware implementations of the processors 220 may include computer-executable or machine-executable instructions written in any suitable programming language to perform the various functions described. Hardware implementations of the processors 220 may be configured to execute computer-executable or machine-executable instructions to perform the various functions described. The one or more processors 220 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The imaging system 120 may also include a chipset (not shown) for controlling communications between the one or more processors 220 and one or more of the other components of the imaging system 120. The one or more processors 220 may also include one or more application specific integrated circuits (ASICs) or application specific standard products (ASSPs) for handling specific data processing functions or tasks.

The input/output (I/O) device(s) 124, 126, such as the touch sensitive display screen 124, may be controlled via the one or more I/O device interfaces 210. The network interfaces(s) 212 may allow the imaging system 110 to communicate via network and/or via other communicative channels. The imaging system 120 may be further configured to access one or more networks (not shown) and entities thereon, such as remote servers, cloud servers, and/or cloud storage resources. The networks may include any one or a combination of different types of suitable communications networks, such as cable networks, the Internet, wireless networks, cellular networks, and other private and/or public networks. Furthermore the networks may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. The storage interface(s) 214 may enable the imaging system 120 to receive and interpret signals from the one or more storage devices 180.

The memory 230 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 230 may store program instructions that are loadable and executable on the processor(s) 220, as well as data generated or received during the execution of these programs. Turning to the contents of the memory 230 in more detail, the memory 230 may include one or more operating systems (O/S) 232, an applications module 234, an image capture module 236, a calibration module 238, an image generation module 240, and an image presentation module 242. Each of the modules and/or software may provide functionality for the user device 120, when executed by the processors 220. The modules and/or the software may or may not correspond to physical locations and/or addresses in memory 230. In other words, the contents of each of the modules 232, 234, 236, 238, 240, 242 may not be segregated from each other and may, in fact be stored in at least partially interleaved positions on the memory 230.

The O/S component 232 may have one or more operating systems stored thereon. The processors 220 may be configured to access and execute one or more operating systems stored in the (O/S) component 220 to operate the system functions of the electronic device. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 234 may contain instructions and/or applications thereon that may be executed by the processors 220 to provide one or more services to the user. These instructions and/or applications may, in certain aspects, interact with the (O/S) component 232 and/or other modules of the imaging system 120. The applications component 234 may have instructions, software, and/or code stored thereon that may be launched and/or executed by the processors 220 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof. In certain embodiments, the applications that are stored in the applications component 234 and executable by the processors 220 may utilize images captured by the image sensor 130, such as images with both visible spectral components and NIR spectral components.

The instructions and/or functionality stored in the image capture module 236 may be executed by the processors 220 to provide a variety of image capture functionality of the imaging system 120. The processors 220 may be configured to receive user 110 input, such as via the I/O devices 124, 126, and based at least in part on the user input, acquire an image of a scene. In some cases, the processors 220 may be configured to cooperate with the image sensor 130 to capture an image of a scene for which the tristimulus matrix is already known for the purposes of generating a colorimetric calibration matrix. The processors 220 may further be configured to store the captured image information in the memory 230 or other suitable storage locations.

The instructions and/or functionality stored in the calibration module 238 may be executed by the processors 220 to provide a variety of image calibration functionality of the imaging system 120, such as generation of the colorimetric calibration matrix. The processors 220 may be configured to identify one or more tristimulus matrices and captured and/or received image information and determine a merit function based thereon. The processors 220 may further be configured to apply the merit function to one or more algorithms to optimize and/or minimize the merit function. By doing so, the processors 220 may be able to determine the colorimetric calibration matrix. The processors 220 may further be configured to store the determined colorimetric calibration matrix in the memory 230.

The instructions and/or functionality stored in the image generation module 240 may be executed by the processors 220 to provide a variety of image generation functionality of the imaging system 120, such as providing an image with visible spectral image components. The processors 220 may be configured to identify and/or access a determined colorimetric calibration matrix, such as one determined by the processes enabled by the calibration module 238, and use the colorimetric calibration matrix to manipulate captured image information by the imaging system 120. The processors may be able to generate a visible image file including spectral information in the visible range and/or a NIR image file including spectral information in the NIR range.

The instructions and/or functionality stored in the image presentation module 242 may be executed by the processors 220 to provide a variety of image presentation functionality of the imaging system 120. The processors 220 may be configured to display one or more images ont eh touch sensitive display screen 124.

It will be appreciated that there may be overlap in the functionality of the instructions stored in the one or more operating systems (O/S) 232, the applications module 234, the image capture module 236, the calibration module 238, the image generation module 240, and the image presentation module 242. In fact, the functions of the aforementioned modules 232, 234, 236, 238, 240, 242 may interact and cooperate seamlessly under the framework of the user device 110. Indeed, each of the functions described for any of the modules 232, 234, 236, 238, 240, 242 may be stored in any module 232, 234, 236, 238, 240, 242 in accordance with certain embodiments of the disclosure. Further, in certain embodiments, there may be one single module that includes the instructions, programs, and/or applications described within the the one or more operating systems (O/S) 232, the applications module 234, the image capture module 236, the calibration module 238, the image generation module 240, and the image presentation module 242.

The memory 230, any databases, and/or any other memory modules, both removable and non-removable, are all examples of computer-readable storage media. For example, computer-readable storage media may include volatile and non-volatile, removable and non-removable media implemented in any method or technology for storage of information such as computer-readable instructions, data structures, program modules, and/or other data.

Illustrative Processes

Figure 3:
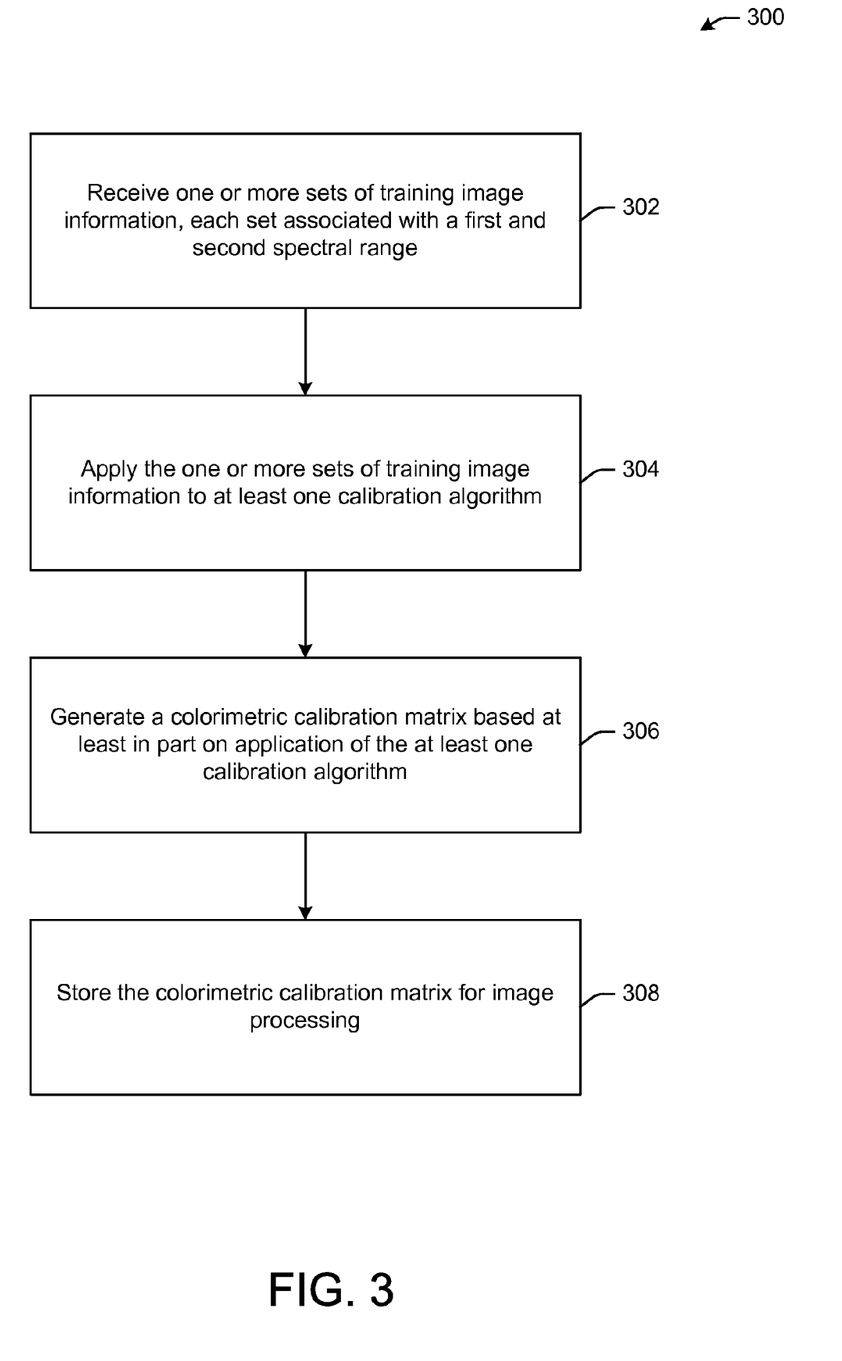
FIG. 3 is a schematic diagram illustrating an example method for generating and storing a colorimetric calibration matrix for separating image information by spectral range, in accordance with embodiments of the disclosure.

Referring now to FIG. 3, example method 300 for generating and storing a colorimetric calibration matrix for separating image information by spectral range, in accordance with embodiments of the disclosure, is discussed. The method 300 may be performed by the processors 220 in cooperation with one or more other elements of imaging system 120.

At block 302, one or more sets of training image information may be received and each set of training image information may be associated with a first and second spectral range. In other words, the training image information received may be from an image sensor sensitive to and detecting both radiation in the visible spectrum and the NIR spectrum, such as a Si-based image sensor without a NIR filter. Therefore, the received training image(s) may have both visible as well as, NIR spectral information convoluted together, such as within the signals resulting from individual pixels of the image sensor. The tristimulus matrix associated with the training image information may further be known. In other words, what the scene, corresponding to each of the received training image information should look like when rendered on a display 126, may be known and manifested in the tristimulus matrices associated with the training image information. The training image information may, in certain embodiments, be the image sensor signal that may be generated by the image sensor 130 of the imaging system 120. For example, the one or more sets of training image information may be an image captured, by the image sensor 130 on the imaging system 120, of a scene for which the corresponding tristimulus matrices may be known. In other cases, the one or more sets of training image information may be transmitted to the imaging system 120 from another entity.

At block 304, the one or more sets of training image information may be applied to at least one calibration algorithm. In certain embodiments, a merit function may be generated based at least in part on the training image information and the associated tristimulus matrix. In one aspect, the merit function may provide a measure of error between a modification of the received training image information and the tristimulus matrix related to the received training image information. The modification of the received training information may be performed by multiplication by a colorimetric calibration matrix. The goal, in certain embodiments, of the calibration algorithm may be to minimize the merit function and thereby minimize the error between a modification of the received training image information and the tristimulus matrix related to the received training image information. Any variety of calibration algorithms may be used, such as analytical algorithms, iterative algorithms, Wiener restoration algorithms, Markov operations, Kalman filtering, evolutionary algorithms, artificial intelligence, Lagrange multipliers, or the like.

At block 306, a colorimetric calibration matrix may be generated based at least in part on application of the at least one calibration algorithm. As discussed above, in certain embodiments, the merit function may be minimized and/or optimized using the at least one calibration algorithm. The minimization of the merit function may be performed by the algorithm in an iterative process by changing the constituent values of the colorimetric calibration matrix. Once a relative minimization of the merit function is achieved, the resulting colorimetric calibration matrix may be used for future image processing by the processors 220 of image file information captured by the imaging system 120 via the image sensors 130.

At block 308, the colorimetric calibration matrix may be stored for future image processing. The processors 220 may store the colorimetric calibration matrix in the memory 230, from where the processors 220 may access the colorimetric calibration matrix for processing images captured by the imaging system 120 and the image sensor 130 thereon, as described in conjunction with FIG. 5.

It will be appreciated that in certain embodiments, the processes of blocks 302, 304, and 306 may be performed remote from the imaging system 120, such as at another computing device. The colorimetric calibration matrix determined at the computing device may then be transmitted by that computing device and may be received by the imaging system 120 for storage locally on the imaging system 120.

It should be noted that the method 300 may be modified in various ways in accordance with certain embodiments. For example, one or more operations of the method 300 may be eliminated or executed out of order in other embodiments. Additionally, other operations may be added to the method 300 in accordance with other embodiments.

Figure 4:
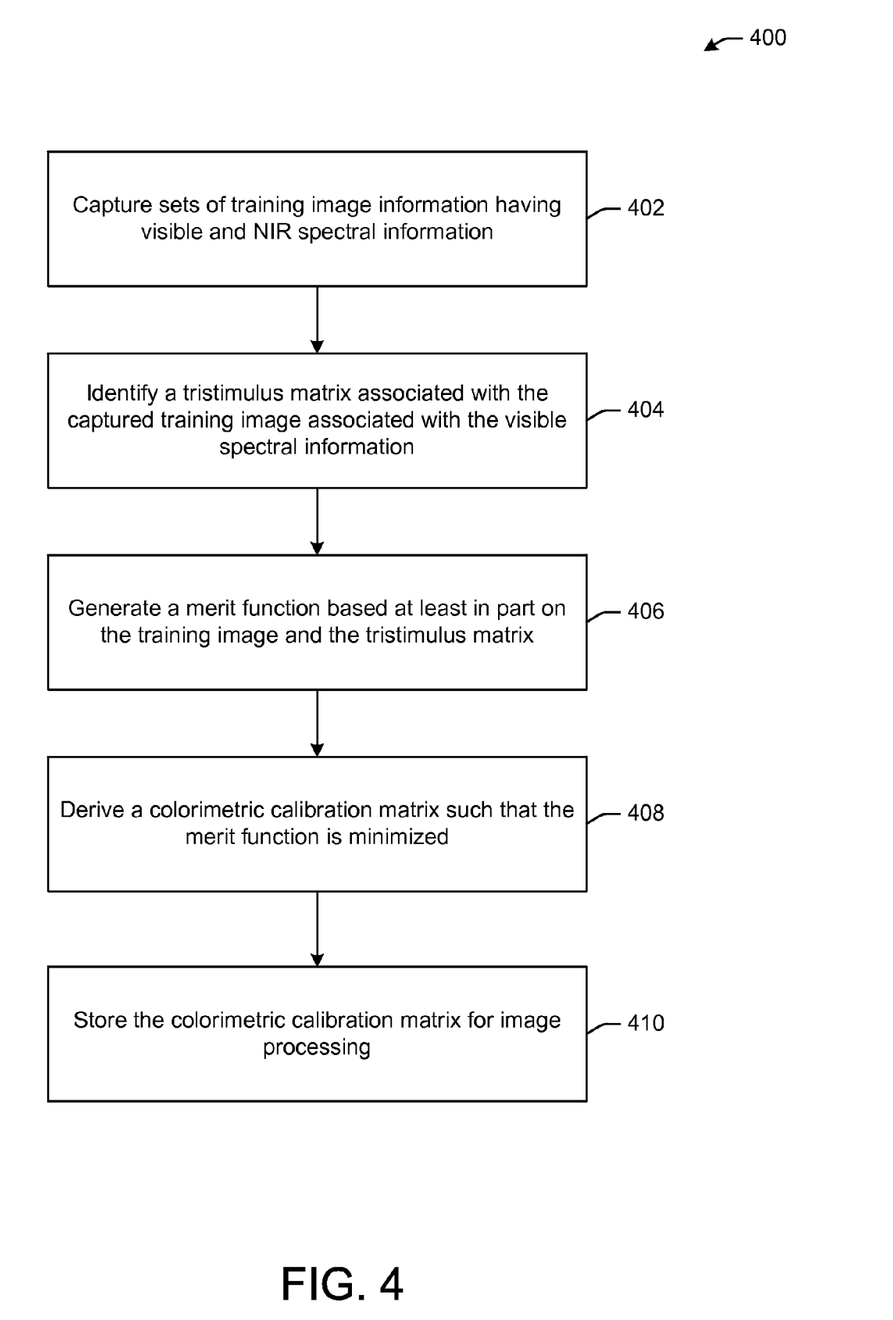
FIG. 4 is a flow diagram illustrating an example method for generating and storing a colorimetric calibration matrix for separating visible spectral range image information form NIR spectral range image information, in accordance with embodiments of the disclosure.

Referring now to FIG. 4 is a flow diagram illustrating an example method 400 for generating an image file with visible image information and/or an image file with NIR image information, in accordance with embodiments of the disclosure, is described. The method 400 may be performed by the processors 220 in cooperation with one or more other components of imaging system 120.

At block 402, one or more sets of training image information may be captured. Each of the one or more captured sets of training image information may have both visible and NIR spectral information. In other words, the training information captured may be a result of an image sensor sensitive to and detecting both radiation in the visible spectrum and the NIR spectrum, such as a Si-based image sensor without a NIR filter. Therefore, the received training image(s) may have both visible as well as, NIR spectral information convoluted together, such as within the signals resulting from individual pixels of the image sensor. The tristimulus matrix associated with the training image information may further be known. The training image information may be the image sensor signal that may be generated by the image sensor 130 of the imaging system 120. For example, the one or more sets of training image information may be an image captured, by the image sensor 130 on the imaging system 120, of a scene for which the corresponding tristimulus matrices may be known. The training image information may be represented as:

$$c = c_v + c_n + n \quad \text{Eq. (1)}$$

where, $c_v$ is the training image information component in the visible spectral range.

$c_n$ is the training image information component in the NIR spectral range.

n is the noise in the captured training image information.

At block 404, a tristimulus value associated with the visible spectral information of the captured training image may be identified. This known tristimulus matrix (t) may be received from another entity, retrieved from memory 230, and/or saved to memory by the processors 220 of the imaging system 120. As mentioned above, the tristimulus matrix (t) may represent the visible image corresponding to the training image information as captured by the imaging system 120 and the image sensor 130 thereon. In other words, the tristimulus matrix (t) represents how the image should look for rendition to the user 110.

At block 406, a merit function may be generated based at least in part on the training image and the tristimulus value. In certain embodiments, the merit function may be generated based at least in part on the training image information and the associated tristimulus matrix. The merit function may provide a measure of error between a modification of the received training image information and the tristimulus matrix (t) related to the received training image information. The modification of the received training information may be performed by multiplication by a colorimetric calibration matrix. A non-limiting example of a merit function may be represented as:

$$J = E\{\|t - Bc\|^2\} = E\{[t-Bc]^t[t-Bc]\} \quad \text{Eq. (2)}$$

where,

E is the expectation operator.

t is the transpose operator.

t is the tristimulus matrix.

B is the colorimetric calibration matrix.

At block 408, a colorimetric calibration matrix may be derived such that the merit function is minimized. This process may entail applying the merit function to one or more algorithms to minimize the merit function, represented as:

$$B = \arg(\min_B J) \quad \text{Eq. (3)}$$

The process of minimizing the merit function (J) may be performed by a variety of algorithms, such as analytical algorithms, iterative algorithms, Wiener restoration algorithms, Markov operations, Kalman filtering, evolutionary algorithms, artificial intelligence, Lagrange multipliers, or the like. It will be noted that some algorithms may be performed in the time domain and others may be performed in the frequency domain, such as spatial frequency. It should also be noted that the minimization of the merit function may be performed using one pixel, multiple pixels, or all of the pixels of the training image available to the imaging system 120. In certain embodiments, a colorimetric calibration matrix may be determined based at least in part on minimizing respective merit functions corresponding to each of multiple pixels of the training image and then the resulting colorimetric matrices may be averaged.

At block 410, the colorimetric calibration matrix (B) may be stored for image processing. The processors 220 may store the colorimetric calibration matrix in the memory 230, from where the processors 220 may access the colorimetric calibration matrix for processing images captured by the imaging system 120 and the image sensor 130 thereon, as described in conjunction with FIG. 5.

It should be noted that the method 400 may be modified in various ways in accordance with certain embodiments. For example, one or more operations of the method 400 may be eliminated or executed out of order in other embodiments. Additionally, other operations may be added to the method 400 in accordance with other embodiments.

Figure 5:
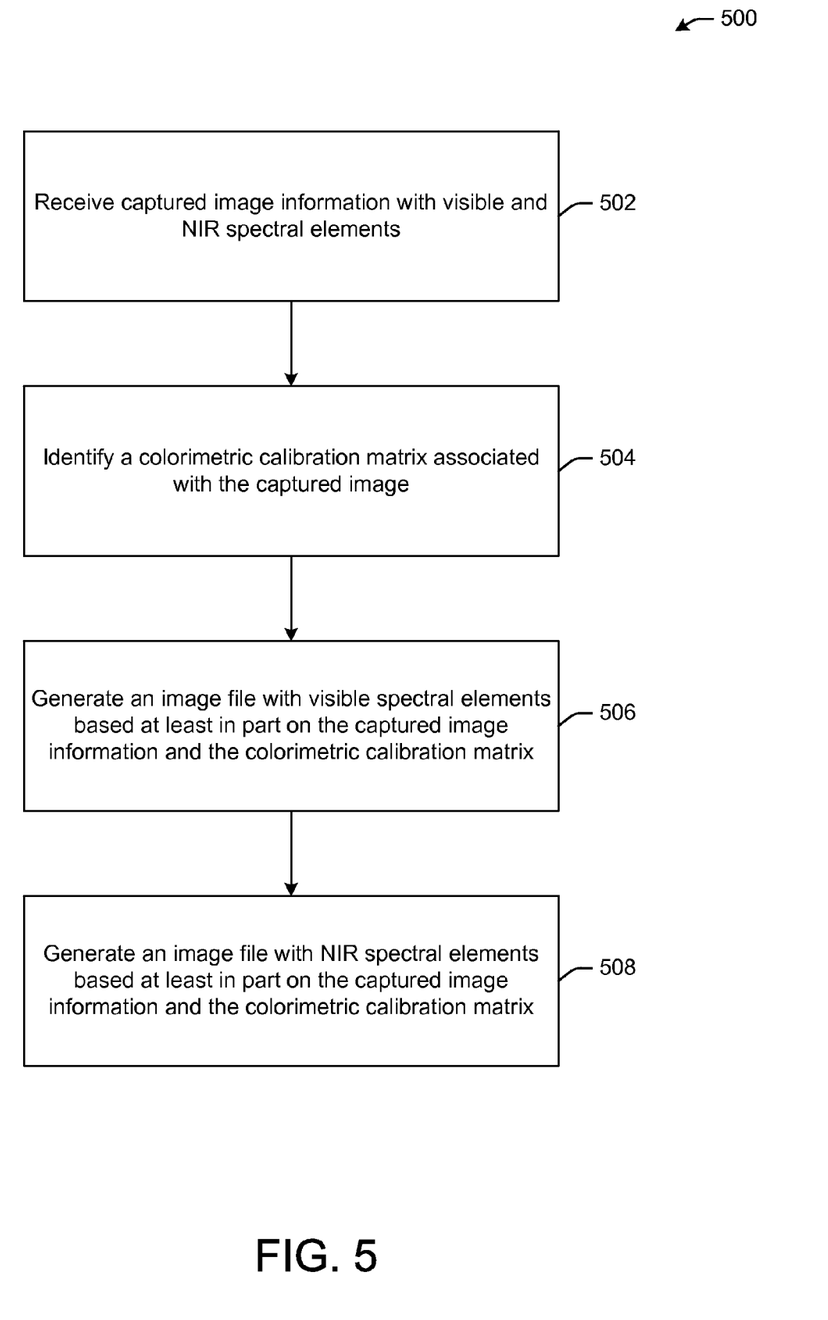
FIG. 5 is a flow diagram illustrating an example method for generating an image file with visible image information and/or an image file with NIR image information, in accordance with embodiments of the disclosure.

Referring now to FIG. 5, an example method 500 for generating an image file with visible image information and/or an image file with NIR image information, in accordance with embodiments of the disclosure, is described. The method 500 may be performed by the imaging system 120 and the processors 220 thereon in cooperation with other devices and/or entities.

At block 502, captured image information with both visible and NIR spectral elements may be received. This captured image information may be received by the processors 220 from the image sensors 130. In some cases, this captured image information may be raw signals from the image sensor 130 and in other cases, the captured image information may be processed image sensor 130 signals. The captured image information may, in some cases, include one or more bytes of data corresponding to each of the pixels of the image sensor 130 with which the scene is imaged by the imaging system 120.

At block 504, a colorimetric calibration matrix associated with the captured image may be identified. The colorimetric calibration matrix may be stored in the memory 230 of the imaging system 120. In certain embodiments, there may be more than one colorimetric calibration matrix stored in the memory of the imaging system 120 and/or accessible by the imaging system 120. In these cases, the processors 220 may identify one or more of the colorimetric calibration matrix as appropriate for the captured image information. This identification may be based on a variety of factors, such as lighting levels, intensity of a particular color range in the captured image and/or associated scene, the focal length of optical elements, such as a lens in the optical path, and/or the zoom of the optical elements.

At block 506, an image file with visible spectral elements may be generated based at least in part on the captured image information and colorimetric calibration matrix. In some cases, the image information in the visible spectral range may be derived by multiplying the colorimetric calibration matrix with the received captured image information. This image information in the visible spectral range may be indicated in a variety of suitable mechanisms. In a non-limiting example, the image information in the visible spectral range may be indicated as three separate intensities for each of the red, green, and blue sub-ranges associated with each pixel of the corresponding image. The red, green, and blue intensities may be indicated as one or more bytes of data corresponding to each of the red, green, and blue intensities of each of the pixels of the image. This data may be stored in the image file with visible spectral elements.

It will be appreciated that the imaging system may further perform any variety of compression and/or other manipulations of the data and/or information associated with the image file. The image file may be in any one of established file formats, or alternatively in proprietary file formats. These file formats may include any one of Joint Photographic Experts Group (JPEG), graphics interchange format (GIF), portable network graphics (PNG), tagged image file format (TIFF), bit map (BMP), or the like and/or in any suitable resolution, size, brightness, or aspect ratio. The processors 220 may perform operations and/or transformations of the image information and/or signals received from the image sensor to provide the image file in the visible spectrum in one or more of the aforementioned file formats.

At block 508, an image file with NIR spectral elements may be generated based at least in part on the captured image information and colorimetric calibration matrix. This process may be similar to the preceding process of block 506 where an image file with visible spectral elements is created. The NIR image file may include one or more data bytes corresponding to each pixel of the image sensor 130. The one or more data bytes, in some non-limiting examples, may be an indicator of the intensity of the intensity of the radiation in the NIR spectral range as detected by the image sensor 130. In certain embodiments, the NIR image file may be similar to a bit map, where a pixel identity and/or location may be associated with one or more intensities within the NIR range associated with that pixel. In certain other embodiments, the same or similar file formats as visible range image files, as discussed above, may be used to memorialize the NIR spectral elements and generate the NIR image file. In yet further embodiments, the NIR spectral elements of the captured image data may be saved to a NIR image file similar to a black and white image file. Such a NIR image file may be rendered to the user 110, such as on the touch sensitive display screen 124, as a black and white, or other monochromatic, image.

In some cases, the NIR spectral information may also be used for a variety of applications, such as security applications, image enhancements, low-light imaging, and/or thermal imaging. For example, the NIR spectral information and/or image file may be used to modify the color and/or the intensity of the one or more pixels of the corresponding visible image and/or image file. This type of image enhancement may, therefore, use the spectral information in the NIR region, which is normally not collected with image sensors with NIR filters, to enhance the visible image, such as by providing a more accurate and/or true to the scene capture of the visible image.

It will be appreciated that in certain embodiments of the disclosure, the segregation of the NIR spectral information and the visible spectral information may be performed prior to further processing of the visible image information. In other words, once the NIR and visible spectral information is separated, such as by implementing method 500, further processing may be performed by the imaging system, such as on the visible image information to generate tristimulus information therefrom. In some cases, this may involve processing using a second colorimetric calibration matrix. In other embodiments, the segregation of the NIR spectral information and the visible spectral information may be performed after processing of the captured image information. In other words, the visible and/or NIR spectral information may be subject to processing, such as processing involving a second colorimetric calibration matrix, before generating the visible and/or NIR image files.

It should be noted that the method 500 may be modified in various ways in accordance with certain embodiments. For example, one or more operations of the method 500 may be eliminated or executed out of order in other embodiments. Additionally, other operations may be added to the method 500 in accordance with other embodiments.

Figure 6:
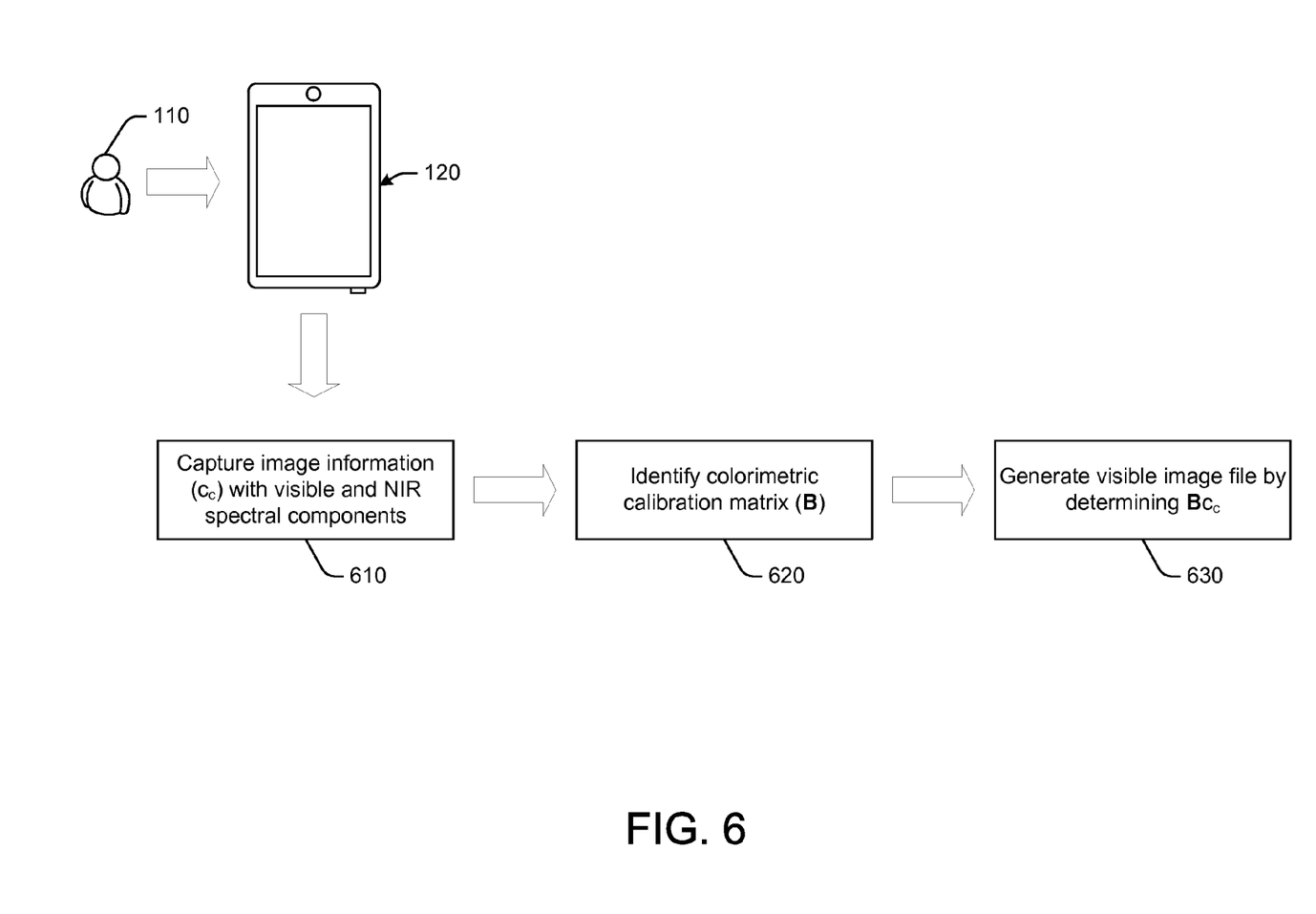
FIG. 6 is a schematic diagram illustrating an example scenario in which captured image information is used to generate a visible image using a colorimetric calibration matrix as determined by the example method of FIGS. 3 and/or 4, in accordance with embodiments of the disclosure.

Referring now to FIG. 6, example scenario 600 in which captured image information is used to generate a visible image using a colorimetric calibration matrix (B) as determined by the method(s) 300, 400, in accordance with embodiments of the disclosure. In this example scenario 600, the user 110 may effectuate a capture of an image and associated image information ($c_c$) on his/her imaging system 120. The image sensor 130 of the imaging system 120 may be a Si-based image sensor without a NIR filter and may therefore provide image information derived from detecting optical radiation in both the visible spectral range and the NIR spectral range as depicted in block 610. Therefore, the captured image information ($c_c$), if rendered on the touch sensitive display 124 may have a relatively high level haze or other degradation in the quality of the rendered image. Because of this degradation of the rendered image associated with the captured image information ($c_c$), the user 110 may wish to filter out the artifacts of the rendered image that arise due to NIR radiation detected by the image sensor 130 while generating the captured image information ($c_c$).

At block 620, the colorimetric calibration matrix (B) may be stored in the memory 230 of the imaging system 120. As described above, the colorimetric calibration matrix (B) may be derived by the methods 300 and 400 as depicted in FIGS. 3 and 4, respectively. At block 630, the processors 220 may take the product of the colorimetric calibration matrix (B) and the captured image information ($c_c$) to generate a visible image information that may be used to generate a visible image file. The visible image file may be provided in any suitable format including, but not limited to, Joint Photographic Experts Group (JPEG), graphics interchange format (GIF), portable network graphics (PNG), tagged image file format (TIFF), bit map (BMP), or the like and/or in any suitable resolution, size, brightness, or aspect ratio. The visible image file may be rendered on a display, such as the touch sensitive display screen 124, of the imaging system 120, to provide a rendered image.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A system, comprising:
    a display;
    at least one memory that stores computer-executable instructions;
    at least one processor communicatively coupled to the display, that accesses the at least one memory, wherein the at least one processor executes the computer-executable instructions to:
        receive training image information, wherein the training image information comprises image information in a visible spectral range and image information in a near-infrared (NIR) spectral range;
        identify a tristimulus matrix corresponding to the visible spectral range of the received training image information;
        generate, based at least in part on the received training image information, the tristimulus matrix and a colorimetric calibration matrix, a merit function;
        optimize the merit function based at least in part on one or more algorithms;
        determine one or more values associated with the colorimetric calibration matrix based at least in part on the optimization of the merit function;
        store the colorimetric calibration matrix in the at least one memory; and
        cause to render captured image information on the display using the colorimetric calibration matrix.

2. The system of claim 1, wherein the visible spectral range corresponds substantially to wavelengths in the range of 380 nanometers (nm) to 780 nm, and wherein the NIR spectral range corresponds substantially to wavelengths in the range of 780 nm to 1125 nm.

3. The system of claim 1, wherein the at least one processor executes the computer-executable instructions to optimize the merit function comprises the at least one processor executes the computer-executable instructions to minimize an expected value of the merit function.

4. The system of claim 1, wherein the one or more algorithms comprises at least one of: (i) analytical algorithms; (ii) iterative algorithms; (iii) Wiener restoration algorithms; (iv) Markov operations; (v) Kalman filtering; (vi) evolutionary algorithms; (vii) artificial intelligence; or (viii) Lagrange multipliers.

5. The system of claim 1, further comprising an image sensor configured to capture the captured image information associated with a scene to be imaged, wherein the at least one processor further executes the computer-executable instructions to receive the captured image information and, based at least in part on the stored colorimetric calibration matrix, to generate a visible image information file associated with the received captured image information in the visible spectral range.

6. The system of claim 5, wherein the at least one processor further executes the computer-executable instructions to process the captured image information based at least in part on the stored colorimetric calibration matrix to generate an NIR image information file associated with the received image information in the NIR spectral range.

7. A method, comprising:
    receiving, by an system comprising one or more processors, captured image information, wherein the captured image information comprises image information associated with a first spectral range and a second spectral range, wherein the first spectral range is associated with first light having a first wavelength between 380 nanometers (nm) to 780 nm, and wherein the second spectral range is associated with second light having a second wavelength between 780 nm to 1125 nm;
identifying a colorimetric calibration matrix;
determining, based at least in part on the captured image information and the colorimetric calibration matrix, the image information in the first spectral range;
generating a first image file based at least in part on the image information in the first spectral range; and
cause to render, on a display, the first image file.

8. The method of claim 7, further comprising rendering the first image file.

9. The method of claim 7, further comprising:
determining, based at least in part on the captured image information and the colorimetric calibration matrix, the image information in the second spectral range; and
generating a second image file based at least in part on the image information in the second spectral range.

10. The method of claim 9, further comprising modifying the first image file based at least in part on the image information in the second spectral range.

11. The method of claim 7, wherein the colorimetric calibration matrix is determined based at least in part on training image information with a tristimulus matrix.

12. The method of claim 11, wherein the colorimetric calibration matrix is determined further based at least in part on a merit function, wherein the merit function is based at least in part on colorimetric calibration matrix, the tristimulus matrix, and the training image information.

13. The method of claim 12, wherein the colorimetric calibration matrix is determined further by performing, on the the merit function at least one of: (i) analytical algorithms; (ii) iterative algorithms; (iii) Wiener restoration algorithms; (iv) Markov operations; (v) Kalman filtering; (vi) evolutionary algorithms; (vii) artificial intelligence; or (viii) Lagrange multipliers.

14. At least one non-transitory computer-readable medium comprising computer-executable instructions that, when executed by one or more processors, executes a method comprising:
receiving training image information (c), wherein the training image information comprises image information associated with a first spectral range and image information associated with a second spectral range, wherein the first spectral range is associated with first light having a first wavelength between 380 nanometers (nm) to 780 nm, and wherein the second spectral range is associated with second light having a second wavelength between 780 nm to 1125 nm;
identify a tristimulus matrix (t) corresponding to the first spectral range of the received training image information;
determining a colorimetric calibration matrix (B) based at least in part on the training image information (c) and the tristimulus matrix (t);
storing the colorimetric calibration matrix (B) in the at least one computer-readable memory; and
causing to render of a first image file on a display, wherein the first image file is based at least in part on the colorimetric calibration matrix (B).

15. The at least one non-transitory computer-readable medium of claim 14, wherein determining the colorimetric calibration matrix (B) further comprises generating, based at least in part on the received training image information (c) and the tristimulus matrix (t) a merit function.

16. The at least one non-transitory computer-readable medium of claim 15, wherein determining the colorimetric calibration matrix (B) further comprises optimizing the merit function based at least in part on one or more algorithms.

17. The at least one non-transitory computer-readable medium of claim 16, wherein optimizing the merit function comprises minimizing a value of the merit function.

18. The at least one non-transitory computer-readable medium of claim 16, wherein the one or more algorithms comprises at least one of: (i) analytical algorithms; (ii) iterative algorithms; (iii) Wiener restoration algorithms; (iv) Markov operations; (v) Kalman filtering; (vi) evolutionary algorithms; (vii) artificial intelligence; or (viii) Lagrange multipliers.

19. The at least one non-transitory computer-readable medium of claim 16, wherein the merit function is $E\{\|t-Bc\|^2\}$, wherein $E\{\ \}$ is an expectation function.

20. The at least one non-transitory computer-readable medium of claim 14, wherein the method further comprises:
receiving a captured image information associated with a scene to be imaged; and
generating, based at least in part on the colorimetric calibration matrix (B), the first image file associated with image information at substantially the first spectral range of the received captured image information.

21. The at least one non-transitory computer-readable medium of claim 20, wherein the method further comprises rendering the first image file on a display.

22. The at least one non-transitory computer-readable medium of claim 20, wherein the method further comprises:
receiving a captured image information associated with a scene to be imaged; and
generating, based at least in part on the colorimetric calibration matrix (B), a second image information file associated with image information at substantially the second spectral range of the received captured image information.

23. The at least one non-transitory computer-readable medium of claim 20, wherein the method further comprises modifying the first image information file based at least in part on the image information in the second spectral range of the received captured image information.

* * * * *